Jan. 10, 1950
F. H. RICHTERKESSING
2,494,311
TROLLEY FROG APPROACH END
Filed Oct. 29, 1945
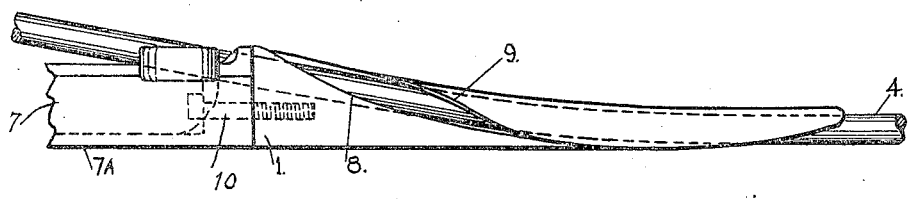
FIG. 1.
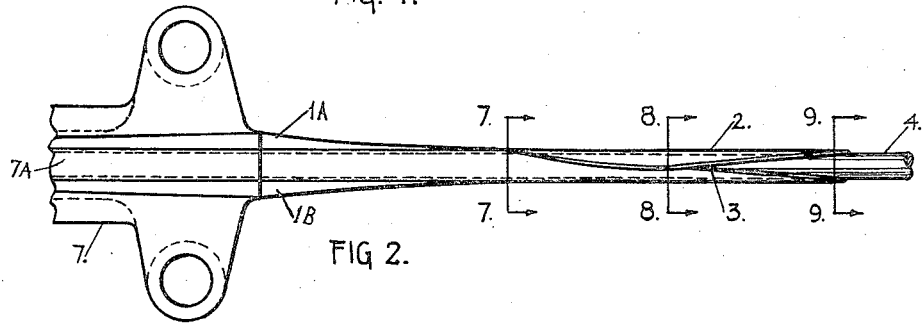
FIG 2.
    
FIG. 7.    FIG. 8.    FIG. 9.
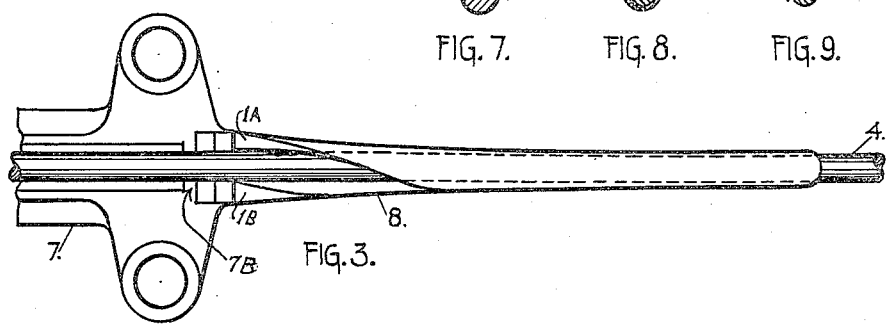
FIG. 3.
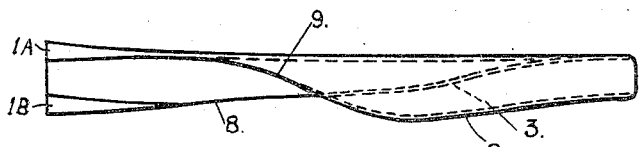
FIG. 4.
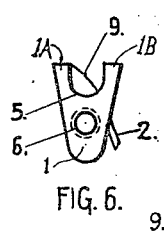
FIG. 6.
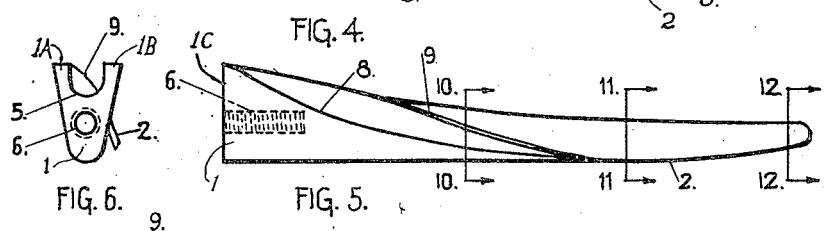
FIG. 5.
FIG. 10.
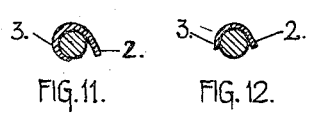
FIG. 11.    FIG. 12.
INVENTOR
FRANK H. RICHTERKESSING.
BY John L. Milton.
ATTORNEY Patented Jan. 10, 1950

2,494,311

UNITED STATES PATENT OFFICE 2,494,311

TROLLEY FROG APPROACH END

Frank H. Richterkessing, Louisville, Ky., assignor to Cheatham Electric Switching Device Co., Incorporated, Louisville, Ky., a corporation of Kentucky Application October 29, 1945, Serial No. 625,241

3 Claims. (Cl. 191—43)

My invention relates to removable approach-ends or "ears" for securing trolley conductor devices, such as frogs, crossings, trolley switches, etc., to a trolley conductor.

One object of my invention is to provide a device of the above designated character which can be expeditiously installed without the use of special tools and when installed provide a superior transition for a trolley shoe, a wheel, especially the former, from the trolley conductor to the under-run portions of the devices of which the ear or end forms a part.

Another object of my invention resides in supplying a readily renewable approach-end which provides protection for that portion of the trolley wire involved for attachment at the point of actual transition of the trolley shoe to the approach end and frog et cetera.

A further object of my invention is to provide an approach end that can be produced principally by foundry operations and secondarily by a minimum of operations by cutting tools.

A still further object of my invention resides in providing a trolley ear that prevents vibration or shock to all the parts involved during the transition of the trolley shoe or wheel from the trolley conductor to the unit of which said approach end forms a part.

To the attainment of these objectives and the accomplishment of other new and useful results hereinafter set out my invention consists of the features of novelty disclosed in the construction, combination, arrangement and configuration of parts herein described and claimed, and shown in the accompanying drawing, which illustrates a preferred embodiment of my invention, and wherein:

Figure 1 is a side elevational view of a fragment of a trolley frog, crossing or similar overhead device and my approach-end secured thereto attached to a trolley conductor in condition for service.

Figure 2 is a view looking upward on Fig. 1.

Figure 3 is a top or plan view of Fig. 1.

Figure 4 is a plan view of the approach-end member or ear 8 prepared for attachment to a trolley conductor.

Figure 5 is an elevational view of Fig. 4.

Figure 6 is an end view of Fig. 5.

Figures 7, 8 and 9 are views in cross section on lines 7, 8 and 9 respectively on Fig. 2.

Figures 10, 11 and 12 are cross sectional views of Fig. 5 on lines 10, 11 and 12 respectively on Fig. 5.

In the drawing numeral 7 indicates an end portion of a trolley frog, crossing, trolley switch or other unit to which is attached my improved approach-end or ear 1 by means of bolt 10, a fuller disclosure of which can be found in patent to Stolp #2,199,941.

The approach-end is fashioned with a spirally disposed deep channel 5, having side walls 8 and 9, with the ends 1A, 1B, abutting the vertical end face number of frog 7. It should be noted that the top vertically disposed open portion of the channel adjacent frog 7 is in alignment with notch 7B for the reception of trolley wire 4.

Figs. 4 and 5 show the trolley ear in its normal state as received from the foundry except for the end vertical face 1C and the taped hole 6. Special attention is directed to extended lip 2 of wall 9 which leaves channel 5 sufficiently open for embracing the trolley wire by tilting the frog to which it is attached, at a sufficient angle to "hook" this lip over wire and then with a winding motion, in terms of the axis of the trolley wire, bring the assembled frog and approach-end to the position shown in Figs. 1, 2 and 3.

After the above steps have been accomplished the frog is mechanically or manually held in engagement with the trolley wire as shown in these figures, when lip 2 is peaned into a closed position around the trolley-wire with the margin thereof abutting, or nearly so, as shown in these figures where upon this part of the work of attaching a frog to a trolley wire has been completed. Since any of the many means for attaching the other end of the frog to the trolley wire can be employed by well known devices and procedure the details thereof are not recounted.

Figs. 10, 11 and 12 show the open state of the trolley ear with the trolley wire lodged therein ready for the peaning operation, which operation when completed will close lip 3 upon the trolley wire lip 2 as explained above.

Sections of the trolley ear at lines 7, 7; 8,8; and 9,9 of Fig. 2 appear substantially as shown respectively in Figs. 7, 8 and 9 after the wire has been enclosed.

Attention is especially directed to Fig. 2 which shows the approach end lips 2 and 3 forming an incline path for the trolley shoe to traverse while passing from the trolley wire on to the trolley frog. Immediately after passing the abutted edges of said lips, the shoe passes on to the lower tongue like surface of the approach-ear, thus forming a smooth under-run with the corresponding lower tongue like surface 7A of the frog, all without interruption or shock of any kind.

While I have shown and described a preferred embodiment of my invention, it is to be understood that changes within the scope of the presented claims can be effected without departing from the spirit and scope of the invention.

What I claim is:

1. In a device of the class described, a body member having a trolley wire receiving means; an integrally formed approach-end member; means for detachably securing said end-member to the body member; said end-member having a deep open channel disposed substantially diagonally axially thereof for receiving a trolley wire through a longitudinal spiral opening of said channel, the side walls of said channel being dissymmetrical with one of said walls laterally embracing more than 180° of said trolley wire.

2. In a device of the class described, a body member having a trolley wire receiving means; an integrally formed approach-end member; means for detachably securing said end-member to the body member; said end-member having a deep open channel disposed substantially diagonally axially thereof for receiving a trolley wire through the longitudinal spiral opening thereof, the said channel having dissymmetrical laterally extending side walls, one of which walls embraces more than 180° of said trolley wire.

3. In a device of the class described, a body member having a trolley wire receiving means at the top side thereof; an integrally formed approach-end member; means for detachably securing said end-member to the body member said end-member having a spirally formed channel for receiving a trolley wire through the opening thereof; said channel having one of the side walls extended transversely beyond the other wall and so proportioned that when closed upon a trolley wire, portions of the longitudinal margins of said walls will abut in close proximity to a tangent at the lower end of the vertical diameter of the trolley wire.

FRANK H. RICHTERKESSING.

REFERENCES CITED

The following references are of record in the file of this patent:

UNITED STATES PATENTS

| Number | Name | Date |
|---|---|---|
| 470,844 | Blackwell | Mar. 15, 1892 |
| 522,362 | Crane | July 3, 1894 |
| 2,199,941 | Stolp | May 7, 1940 |

FOREIGN PATENTS

| Number | Country | Date |
|---|---|---|
| 130,265 | Germany | Undated |